(12) United States Patent
Shiraishi et al.

(10) Patent No.: US 11,084,330 B2
(45) Date of Patent: Aug. 10, 2021

(54) PNEUMATIC TIRE

(71) Applicant: The Yokohama Rubber Co., LTD., Tokyo (JP)

(72) Inventors: Takayuki Shiraishi, Hiratsuka (JP); Hiraku Kouda, Hiratsuka (JP); Tatsuro Shinzawa, Hiratsuka (JP); Takanori Uemura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 202 days.

(21) Appl. No.: 16/331,068

(22) PCT Filed: Sep. 5, 2017

(86) PCT No.: PCT/JP2017/031959
§ 371 (c)(1),
(2) Date: Mar. 6, 2019

(87) PCT Pub. No.: WO2018/047819
PCT Pub. Date: Mar. 15, 2018

(65) Prior Publication Data
US 2019/0193475 A1    Jun. 27, 2019

(30) Foreign Application Priority Data
Sep. 9, 2016   (JP) .............................. JP2016-176700

(51) Int. Cl.
*B60C 11/12*   (2006.01)
*B60C 11/03*   (2006.01)
*B60C 11/13*   (2006.01)

(52) U.S. Cl.
CPC .......... *B60C 11/1281* (2013.01); *B60C 11/03* (2013.01); *B60C 11/0302* (2013.01);
(Continued)

(58) Field of Classification Search
CPC ............ B60C 2011/1213; B60C 11/12; B60C 11/1204; B60C 11/1281
See application file for complete search history.

(56) References Cited

U.S. PATENT DOCUMENTS

2013/0206298 A1   8/2013   Guillermou et al.
2016/0152090 A1   6/2016   Takemoto
(Continued)

FOREIGN PATENT DOCUMENTS

JP   2013-537134   9/2013
JP   2015-160487   9/2015
(Continued)

OTHER PUBLICATIONS

International Search Report for International Application No. PCT/JP2017/031959 dated Dec. 12, 2017, 4 pages, Japan.

*Primary Examiner* — Steven D Maki
*Assistant Examiner* — Cedrick S Williams
(74) *Attorney, Agent, or Firm* — Thorpe North & Western (57) ABSTRACT

A pneumatic tire includes chamfered portions respectively formed on a leading side edge and a trailing side edge of a sipe. The sipe includes a non-chamfered region in which other chamfered portions are not present, in a plan view of a tread portion. At least one of the chamfered portions includes an outer edge profile line not parallel to a ridge line of the sipe. When the chamfered portion including the outer edge profile line not parallel to the ridge line of the sipe is divided into an inner region and an outer region corresponding to half a chamfer length of the chamfered portion in a tire width direction, a projected area of the outer region positioned on a rib outer side is larger than a projected area of the inner region positioned on a rib inner side.

6 Claims, 9 Drawing Sheets

(52) U.S. Cl.
CPC .......... *B60C 11/12* (2013.01); *B60C 11/1204* (2013.01); *B60C 11/1236* (2013.01); *B60C 11/1259* (2013.01); *B60C 11/13* (2013.01); *B60C 2011/1213* (2013.01)

(56) References Cited

U.S. PATENT DOCUMENTS

| | | |
|---|---|---|
| 2016/0297254 A1 | 10/2016 | Numata |
| 2019/0001753 A1* | 1/2019 | Hayashi .................. B60C 11/04 |

FOREIGN PATENT DOCUMENTS

| | | |
|---|---|---|
| JP | 2015-231812 | 12/2015 |
| JP | 2016-101802 | 6/2016 |
| WO | WO 2012/032144 | 3/2012 |
| WO | WO 2015/083474 | 6/2015 |
| WO | WO 2017/141651 | 8/2017 |

* cited by examiner

PNEUMATIC TIRE

TECHNICAL FIELD

The present technology relates to a pneumatic tire, and more particularly to a pneumatic tire that achieves improved snow performance and achieves improved steering stability performance on dry road surfaces and improved steering stability performance on wet road surfaces in a compatible manner by devising a chamfered shape of a sipe.

BACKGROUND ART

Conventionally, in a tread pattern of a pneumatic tire, a plurality of sipes are formed on ribs defined by a plurality of main grooves. Such a sipe is provided such that drainage is ensured and steering stability performance on wet road surface is achieved. However, when a large number of sipes are arranged in the tread portion for improving the steering stability performance on wet road surfaces, the rigidity of the rib is reduced, so that there is a disadvantage that steering stability performance on dry road surfaces is deteriorated.

Various proposals have been made on pneumatic tires in which a sipe is formed in a tread pattern and a chamfer of the sipe is provided (see, for example, Japan Unexamined Patent Publication No. 2013-537134). When a sipe is formed and the chamfer thereof is provided, the edge effect may be lost depending on the shape of chamfer, and improvement in steering stability performance on dry road surfaces or steering stability performance on wet road surfaces may be insufficient depending on the chamfering size.

At the same time, in a pneumatic tire, a plurality of sipes have been provided in a tread pattern such that snow performance is achieved. It is effective to increase a groove volume such that snow traction is secured, and snow performance is performed. However, when the groove volume of the tread portion is increased, since the block rigidity is lowered, the steering stability performance on wet road surfaces tends to deteriorate. It is therefore difficult to achieve the steering stability performance on wet road surfaces and the snow performance in a compatible manner.

SUMMARY

The present technology provides a pneumatic tire that achieves improved snow performance and achieves improved steering stability performance on dry road surfaces and improved steering stability performance on wet road surfaces in a compatible manner by devising a sipe chamfer shape.

A pneumatic tire of the present technology includes a plurality of main grooves extending in a tire circumferential direction in a tread portion and a sipe extending in a tire width direction in a rib defined by the plurality of main grooves. The sipe includes a leading side edge and a trailing side edge, a chamfered portion shorter than a sipe length of the sipe is formed in each of the leading side edge and the trailing side edge, a non-chamfered region without other chamfered portions is present in a part facing each chamfered portion of the sipe, in a plan view of the tread portion, at least one of the chamfered portions includes an outer edge profile line not parallel to a ridge line of the sipe, and when the chamfered portion including the outer edge profile line not parallel to the ridge line of the sipe is divided into an inner region and an outer region corresponding to half a chamfer length of the chamfered portion in the tire width direction, a projected area Oa of the outer region positioned on a rib outer side is larger than a projected area Ia of the inner region positioned on a rib inner side.

According to the present technology, in a pneumatic tire having a sipe extending in the tire width direction on a rib defined by a main groove, while a chamfered portion shorter than the sipe length of the sipe is provided in each of the leading edge side and trailing edge side of the sipe, there is a non-chamfered region without other chamfered portions in the part facing each chamfered portion in the sipe, thereby improving the drainage effect based on the chamfered portion, and at the same time the non-chamfered region is capable of effectively removing the water film by the edge effect. This thereby enables steering stability performance on wet road surfaces to be significantly improved. Moreover, since the chamfered portion and the non-chamfered region are mixed in each of the leading side edge and the trailing side edge, the beneficial effect of improving the wet performance as described above may be maximized at the time of braking and at the time of accelerating. Further, compared to the sipe chamfered in a conventional manner, since the area to be chamfered can be minimized, improvement in steering stability performance on dry road surfaces is enabled. As a result, achieving improvement in the steering stability performance on dry road surfaces and improvement in the steering stability performance on wet road surfaces is achieved in a compatible manner.

Further, in a plan view of the tread portion, at least one of the chamfered portions has an outer edge profile line not parallel to a ridge line of the sipe, and when a chamfered portion having an outer edge profile line not parallel to a ridge line of the sipe is divided into an inner region and an outer region corresponding to half a chamfer length of the chamfered portion in the tire width direction, a projected area Oa of the outer region positioned on the rib outer side is larger than a projected area Ia of the inner region positioned on the rib inner side, thereby enabling improvement in the steering stability performance on wet road surfaces and improvement in the snow performance in a compatible manner.

In the present technology, it is preferable that a maximum depth x (mm) of the sipe and a maximum depth y (mm) of the chamfered portion satisfy a relationship of a following formula (1), and a sipe width of the sipe is constant in a range from an end positioned inward of the chamfered portion in a tire radial direction to a groove bottom of the sipe. Since the area to be chamfered may be minimized compared with the conventionally chamfered sipe, this enables the steering stability performance on dry road surfaces to be improved. As a result, improvement in the steering stability performance on dry road surfaces and improvement in the steering stability performance on wet road surfaces is achieved in a compatible manner.

$$x \times 0.1 \leq y \leq x \times 0.3 + 1.0 \tag{1}$$

In the present technology, it is preferable that, a ratio Oa/Ia of the projected area Oa of the outer region to the projected area Ia of the inner region is from 1.2 to 2.0. More preferably, a ratio Oa/Ia is from 1.4 to 1.8. This thereby enables the steering stability performance on dry road surfaces and the steering stability performance on wet road surfaces to be improved in a well-balanced manner. Note that, the projected area Ia of the inner region and a projected area Oa of the outer region of the chamfered portion are the areas of the respective regions measured when the tread portion is projected in the thickness direction.

In the present technology, it is preferable that the pneumatic tire has a designated mounting direction with respect to a vehicle, and the chamfered portion including the outer edge profile line not parallel to the ridge line of the sipe is positioned on a vehicle inner side. This thereby enables the steering stability performance on wet road surfaces and the snow performance to be effectively achieved.

BRIEF DESCRIPTION OF DRAWINGS

FIGS. 8A and 8B illustrate other modified examples of the sipe and the chamfered portion thereof of the pneumatic tire according to the present technology, and FIGS. 8A and 8B are plan views of the respective modified examples.

DETAILED DESCRIPTION

Configuration of embodiments of the present technology are described in detail below with reference to the accompanying drawings. Note that, in FIG. 1, CL is the tire equatorial plane.

Figure 1:
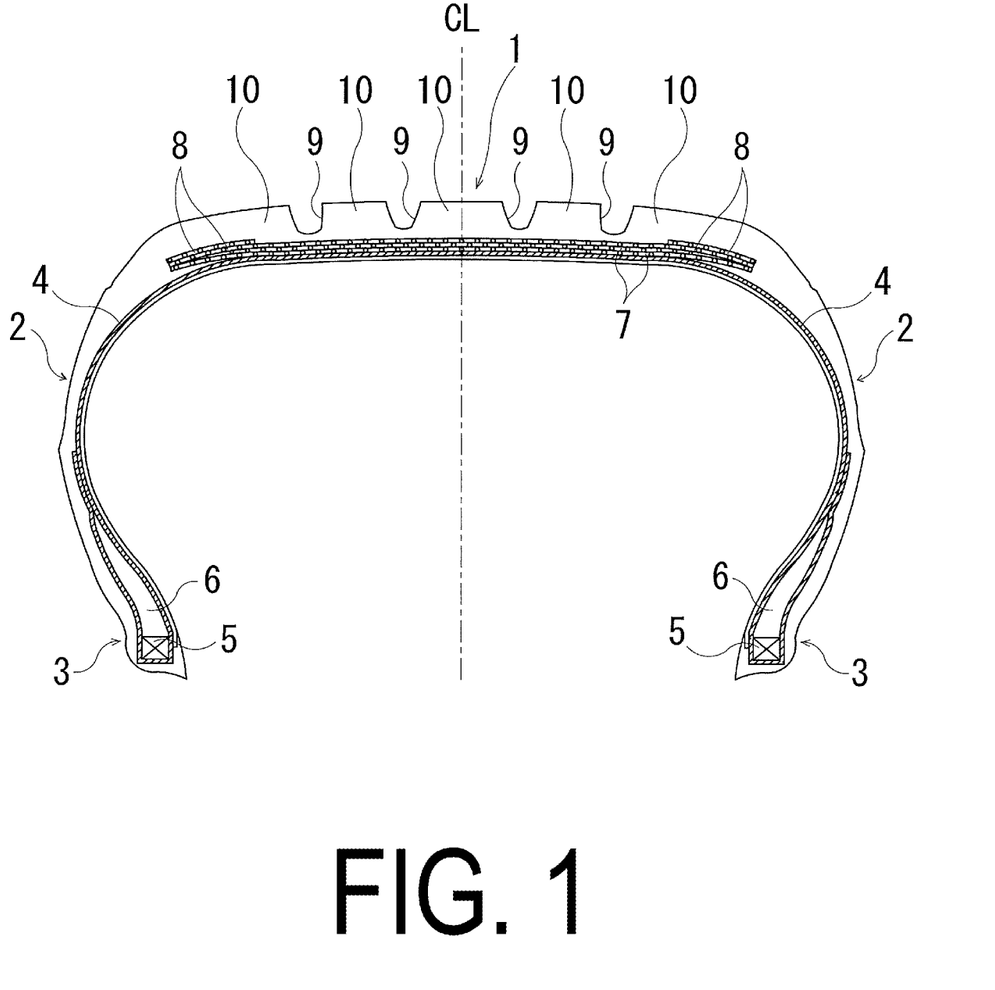
FIG. 1 is a meridian cross-sectional view illustrating a pneumatic tire according to an embodiment of the present technology.

As illustrated in FIG. 1, a pneumatic tire according to embodiments of the present technology includes an annular tread portion 1 extending in the tire circumferential direction, a pair of sidewall portions 2, 2 disposed on both sides of the tread portion 1, and a pair of bead portions 3, 3 disposed on the sidewall portions 2 in the tire radial direction inside.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on an outer circumferential side of the carcass layer 4 in the tread portion 1. The belt layers 7 include a plurality of reinforcing cords that are inclined with respect to the tire circumferential direction with the reinforcing cords of the different layers arranged in a criss-cross manner. In the belt layers 7, an inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8 formed by arranging the reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1. These main grooves 9 define the tread portion 1 into a plurality of rows of ribs 10.

Note that the tire internal structure described above represents a typical example of a pneumatic tire, but the pneumatic tire is not limited thereto.

Figure 2:
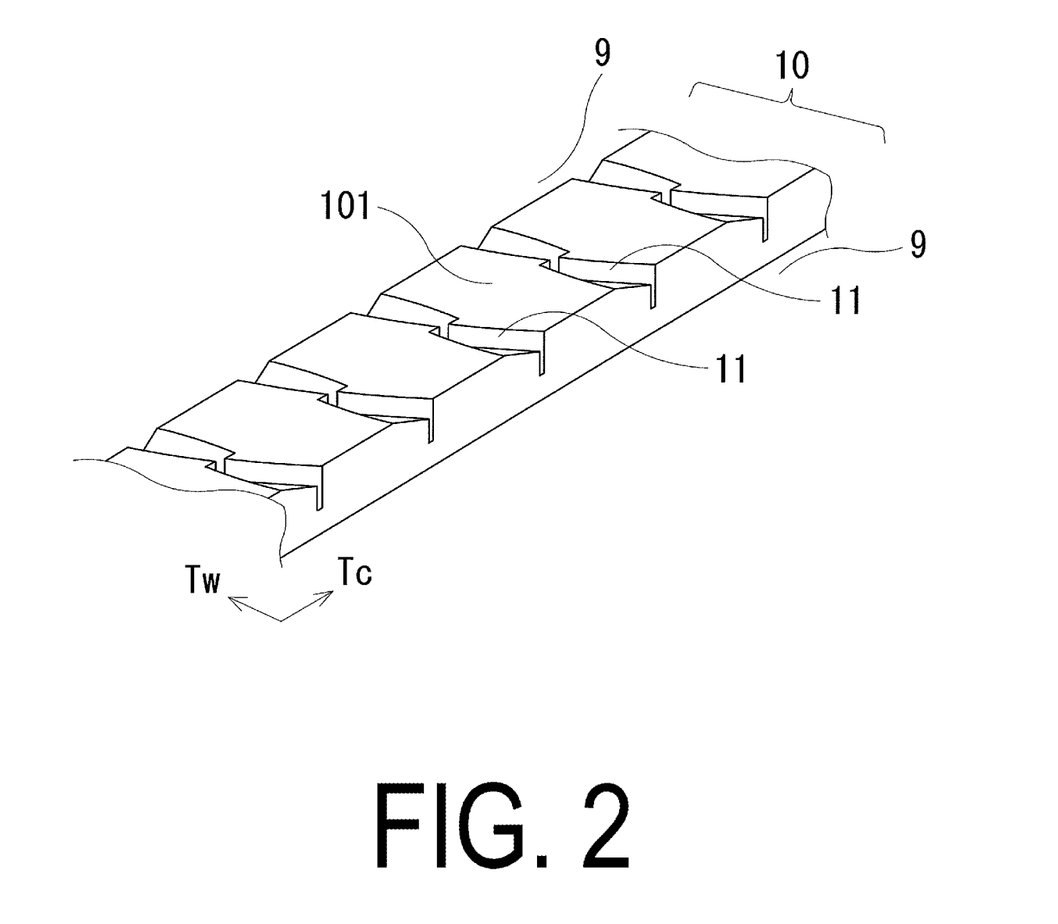
FIG. 2 is a perspective view illustrating part of the tread portion of the pneumatic tire according to the present technology.
Figure 3:
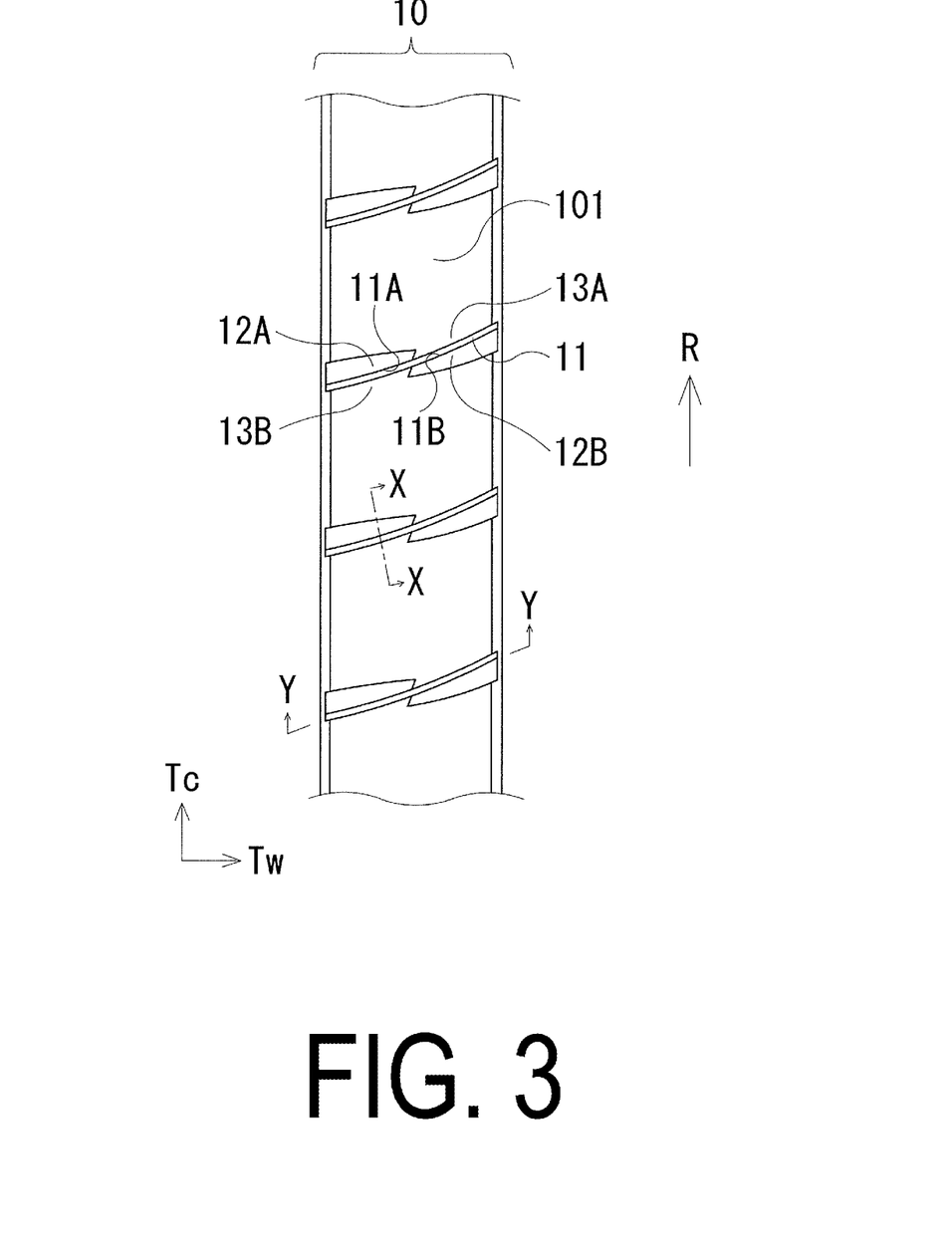
FIG. 3 is a plan view illustrating part of the tread portion of the pneumatic tire according to the present technology.
Figure 4:
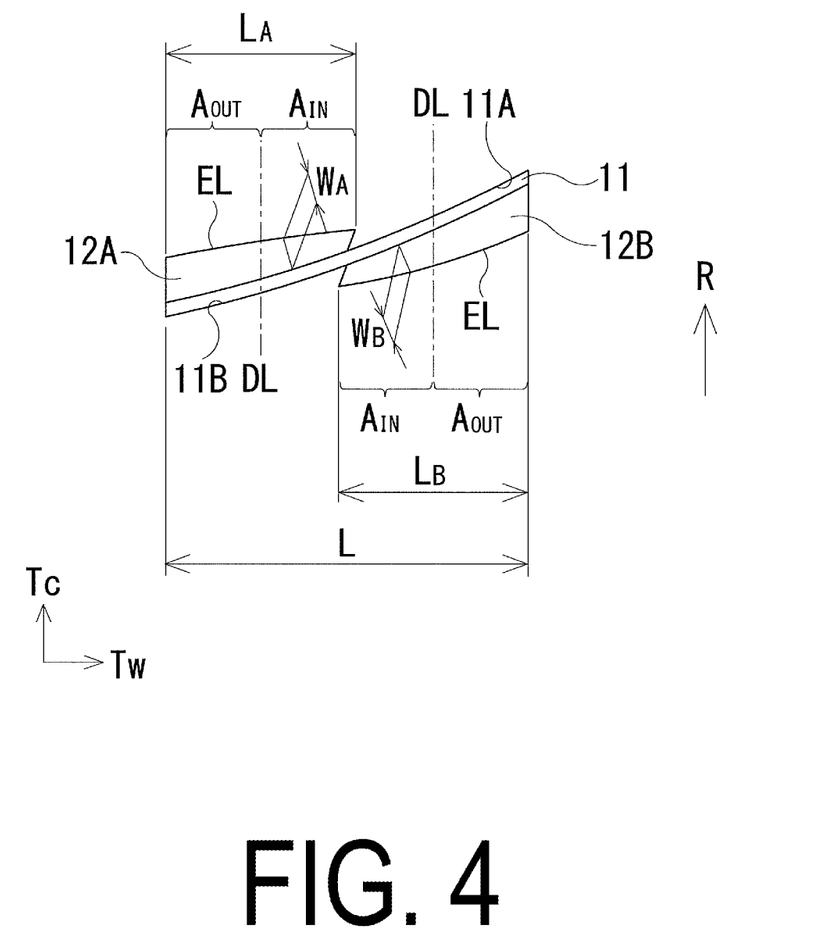
FIG. 4 is a plan view illustrating a sipe and a chamfered portion thereof formed in the tread portion of FIG. 3.

FIGS. 2 to 4 illustrate a part of the tread portion 1, Tc indicates the tire circumferential direction, and Tw indicates the tire width direction. As illustrated in FIG. 2, the rib 10 includes a plurality of sipes 11 extending in the tire width direction, and a block 101 defined by the sipes 11. The plurality of blocks 101 are arranged to line up in the tire circumferential direction. The sipe 11 is an open sipe extending through the rib 10 in the tire width direction. Namely, both ends of the sipe 11 communicate with the main groove 9 positioned on both sides of the rib 10. The sipe 11 is a narrow groove having a groove width of 1.5 mm or less.

As illustrated in FIG. 3, the sipe 11 has a curved shape as a whole, and is formed in the rib 10 at intervals in the tire circumferential direction. Further, the sipe 11 has an edge 11A which is on the leading side with respect to a rotation direction R, and an edge 11B which is on the trailing side with respect to the rotation direction R. A chamfered portion 12 is formed on each of the edge 11A on the leading side and the edge 11B on the trailing side.

The chamfered portion 12 has a chamfered portion 12A which is on the leading side with respect to the rotation direction R and a chamfered portion 12B which is on the trailing side with respect to the rotation direction R. There is a non-chamfered region 13 without other chamfered portions present in the part facing the chamfered portion 12. Namely, there is a non-chamfered region 13B which is on the trailing side with respect to the rotational direction R at a portion facing the chamfered portion 12A and a non-chamfered region 13A which is on the leading side with respect to the rotational direction R at a portion facing the chamfered portion 12B. As described above, the chamfered portion 12 and the non-chamfered region 13 without other chamfered portions are disposed adjacent to each other on each of the edge 11A on the leading side and the edge 11B on the trailing side of the sipe 11.

As illustrated in FIG. 4, in the sipe 11 and the chamfered portions 12A and 12B, the length in the tire width direction is set as a sipe length L, and chamfered lengths $L_A$, $L_B$, respectively. These sipe length L and the chamfered lengths $L_A$, $L_B$ are the lengths, in the tire width direction from one end to the other end, of each of the sipes 11 and the chamfered portions 12A and 12B. The chamfered lengths $L_A$, $L_B$ of the chamfered portions 12A and 12B are both formed to be shorter than the sipe length L of the sipe 11.

Further, in the plan view of the tread portion 1, the chamfered portions 12A, 12B have outer edge profile lines EL that are not parallel to the ridge lines (the edge 11A on the leading side and the edge 11B on the trailing side) of the sipes 11. Namely, this means that, in the chamfered portions 12A, 12B, chamfer widths $W_A$, $W_B$, which are the widths measured along the direction orthogonal to the sipe 11, are not formed to be constant in the range from one end to the other end of the chamfered portions 12A, 12B. In the embodiment illustrated in FIG. 4, both the chamfered portions 12A and 12B have the outer edge profile line EL not parallel to the ridge line of the sipe 11, but in the present technology it suffices that at least one of the chamfered portions 12A and 12B has the outer edge profile line EL not parallel to the ridge line of the sipe 11.

Further, in the chamfered portions 12A, 12B, when each portion is divided by a line segment DL that divides the chamfer lengths $L_A$, $L_B$ in the tire width direction into two equal length parts, an inner region positioned on the rib 10 inner side is defined as $A_{IN}$ and an outer region positioned on the rib 10 outer side is defined as $A_{OUT}$. Then, a projected area of the inner region $A_{IN}$ is set as Ia and a projected area of the outer region $A_{OUT}$ is set as Oa. Here, the projected area Oa of the outer region $A_{OUT}$ is larger than the projected area Ia of the inner region $A_{IN}$. Note that the line segment DL is a line segment along the tire circumferential direction.

In the above-described pneumatic tire, by providing the chamfered portion 12 shorter than the sipe length L of the sipe 11 in each of the leading side edge 11A and trailing side edge 11B of the sipe 11, and since there is a non-chamfered region 13 without other chamfered portions present in the region facing each chamfered portion 12 in the sipe 11, the drainage effect is improved based on the chamfered portion 12 and at the same time the non-chamfered region 13 is capable of effectively removing the water film by the edge effect. This thereby enables steering stability performance on wet road surfaces to be significantly improved. Moreover, since the chamfered portion 12 and the non-chamfered region 13 without other chamfered portions are mixed in each of the leading side edge 11A and the trailing side edge 11B, the beneficial effect of improving the wet performance as described above may be maximized at the time of braking and at the time of accelerating.

Further, in a plan view of the tread portion 1, at least one of the chamfered portions 12 has an outer edge profile line EL line not parallel to a ridge line of the sipe 11, and in the chamfered portions 12 having an outer edge profile line EL not parallel to a ridge line of the sipe 11, a projected area Oa of the outer region $A_{OUT}$ positioned on the rib 10 outer side is larger than a projected area Ia of the inner region $A_{IN}$ positioned on the rib inner side, thereby enabling drainage and the edge effect to be secured and improvement in the steering stability performance on wet road surfaces and improvement in the snow performance to be achieved in a compatible manner.

Particularly, it is preferable that a ratio Oa/Ia of the projected area Oa of the inner region $A_{OUT}$ to the projected area Ia of the outer region $A_{IN}$ is from 1.2 to 2.0. More preferably, a ratio Oa/Ia is from 1.4 to 1.8. Configuring the projected area Oa appropriately with respect to the projected area Ia in this manner enables the steering stability performance on dry road surfaces and the steering stability performance on wet road surfaces to be improved in a well-balanced manner.

Figure 5:
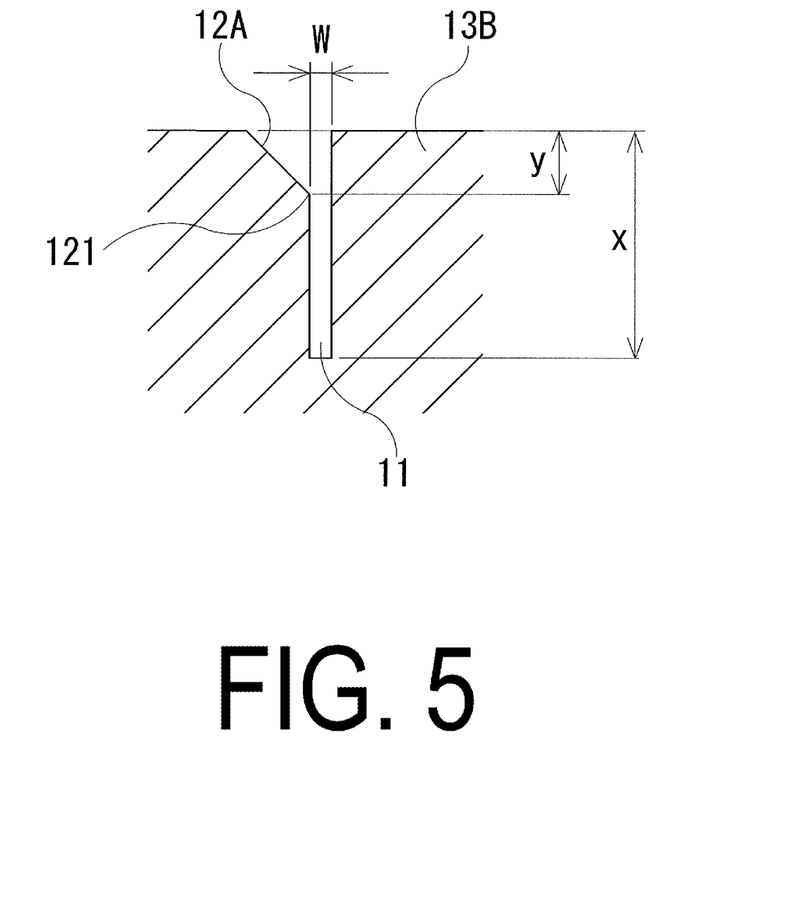
FIG. 5 is a cross-sectional view taken along the line X-X of FIG. 3.

FIG. 5 is a cross-sectional view perpendicular to the sipe 11, in which the tread portion 1 is cut out in the vertical direction. As illustrated in FIG. 5, when the maximum depth of the sipe 11 is set as x (mm) and the maximum depth of the chamfered portion 12 is set as y (mm), the sipe 11 and the chamfered portion 12 are formed such that the maximum depth x (mm) and the maximum depth y (mm) satisfy the relationship of the following formula (1). The maximum depth x of the sipe 11 is preferably 3 mm to 8 mm. The sipe width W of the sipe 11 is substantially constant in a range from the end 121 located on the inner side in the tire radial direction of the chamfered portion 12 to the groove bottom of the sipe 11. The sipe width W is determined such that the width is the substantially measured width of the sipe 11, for example, in a case that a ridge exists on the groove wall of the sipe 11, by not including the height of the ridge in the sipe width, or in a case that the sipe width of the sipe 11 gradually narrows toward the groove bottom, by not including the narrowed portion in the sipe width.

$$x \times 0.1 \leq y \leq x \times 0.3 + 1.0 \tag{1}$$

In the above-described pneumatic tire, it is preferable that the maximum depth x (mm) and the maximum depth y (mm) satisfy the relationship of the formula (1) described above. Providing the sipe 11 and the chamfered portion 12 so as to satisfy the relationship of the above-described formula (1) enables the area to be chamfered to be minimized compared with the sipe provided with the conventional chamfering, thereby enabling the steering stabilizing performance on dry road surfaces to be improved. As a result, improvement in the steering stability performance on dry road surfaces and improvement in the steering stability performance on wet road surfaces is achieved in a compatible manner. Here, if y<x×0.1, the drainage effect based on the chamfered portion 12 becomes insufficient, and conversely, if y>x×0.3+1.0, the rigidity of the rib 10 deteriorates lowering the steering stability performance on dry road surfaces. It is particularly preferable to satisfy the relation y≤x×0.3+0.5.

Figure 6:
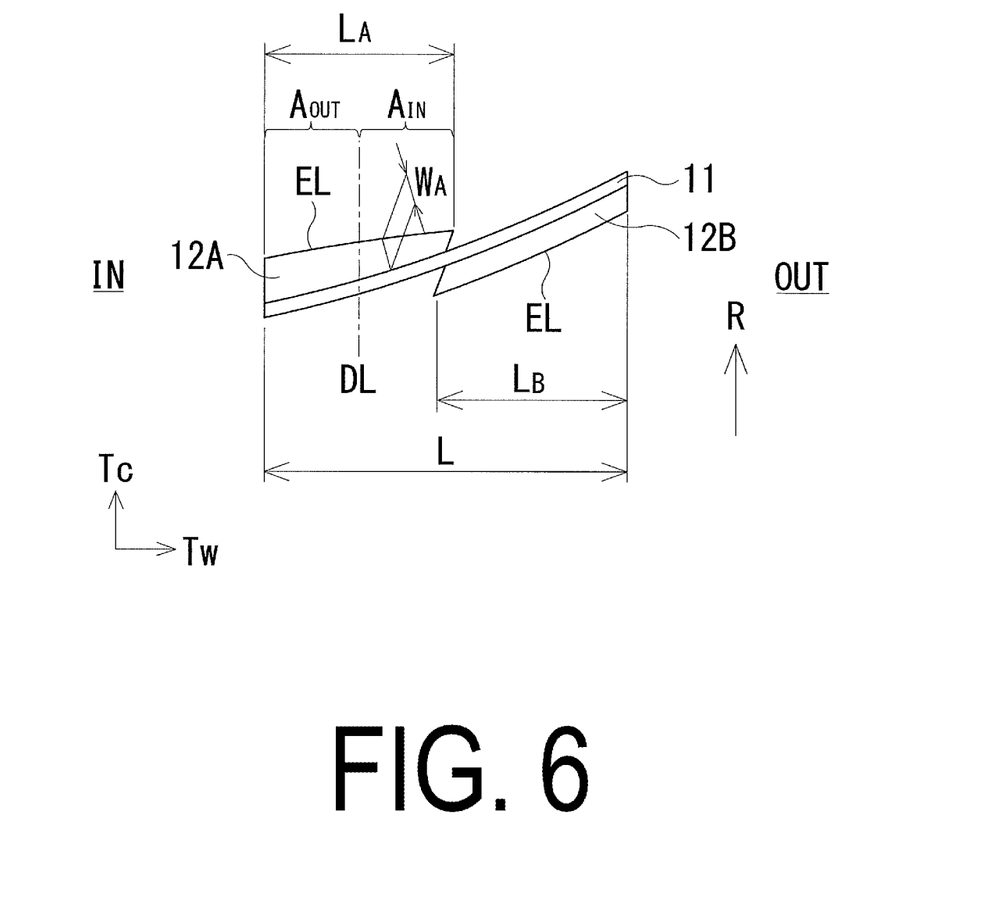
FIG. 6 is a plan view illustrating a modified example of a sipe and a chamfered portion thereof formed in a tread portion of the pneumatic tire according to the present technology.

FIG. 6 illustrates another modified example of the sipe 11 and the chamfered portion 12 thereof formed in the tread portion 1 of the pneumatic tire according to the present technology. In FIG. 6, the mounting direction of the pneumatic tire with respect to the vehicle is specified, IN indicating the vehicle inner side and OUT indicating the vehicle outer side. In a plan view of the tread portion 1, whereas the outer edge profile line EL of the chamfered portions 12B is parallel to the ridge line of the sipe 11, the outer edge profile line EL of the chamfered portions 12A is not parallel to the ridge line of the sipe 11. Namely, when one of the chamfered portions 12A and 12B has an outer edge profile line EL not parallel to the ridge line, a chamfered portion 12A having the outer edge profile line EL not parallel to the ridge line of the sipe 11 is configured to be positioned on the vehicle inner side. Providing the chamfered portions 12 in this manner positions the chamfered portion 12 having the relatively larger projected area on the vehicle inner side, thereby enabling the steering stability performance on wet road surfaces and the snow performance to be efficiently improved.

Figure 7:
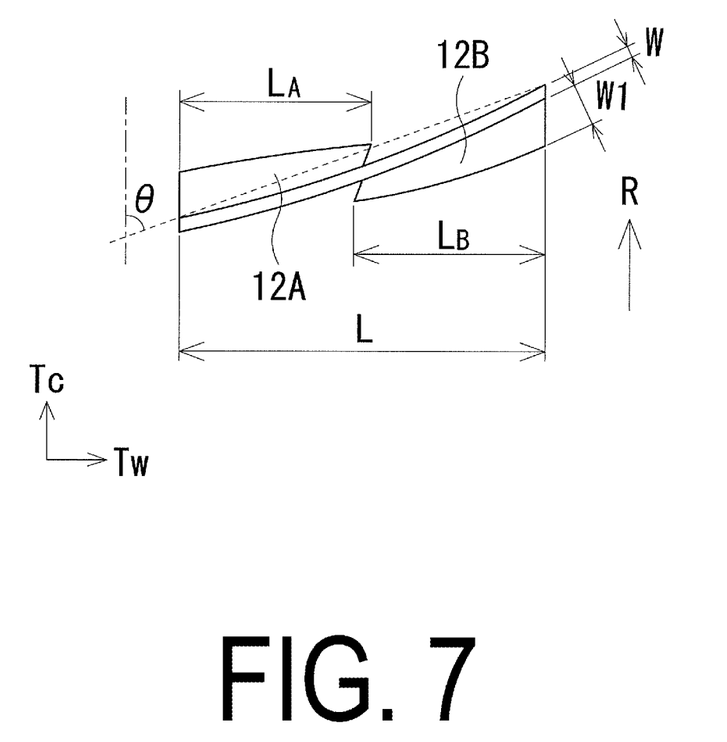
FIG. 7 is a plan view illustrating another modified example of a sipe and a chamfered portion thereof formed in a tread portion of the pneumatic tire according to the present technology.

FIG. 7 illustrates another modified example of the sipe 11 and the chamfered portion 12 thereof formed in the tread portion 1 of the pneumatic tire according to the present technology. The sipe 11 illustrated in FIG. 7 is formed to have an inclination angle θ with respect to the tire circumferential direction. The inclination angle θ refers to an angle formed between a virtual line (a dotted line illustrated in FIG. 7) connecting both ends of the sipe 11 and a side surface of the block 101. There is an inclination angle on the acute angle side and an inclination angle on the obtuse angle side, and the inclination angle θ on the acute angle side is illustrated in FIG. 7. The inclination angle θ is targeted for the inclination angle of the sipe 11 with an intermediate pitch in the rib 10. In this case, the inclination angle θ on the acute angle side is preferably from 40° to 80°, more preferably from 50° to 70°. By inclining the sipe 11 with respect to the circumferential direction of the tire in this manner, the pattern rigidity can be improved, and the steering stability performance on dry road surfaces can be further improved. Here, when the inclination angle θ is smaller than 40°, the uneven wear resistance deteriorates, and when it exceeds 80°, the pattern rigidity cannot be sufficiently improved.

In the present technology, the side having the inclination angle θ on the acute angle side of the sipe 11 is defined as the acute angle side, and the side having the inclination angle θ on the obtuse angle side of the sipe 11 is defined as the obtuse angle side. The chamfered portions 12A and 12B formed on the edges 11A and 11B of the sipe 11 are formed on the acute angle side of the sipe 11. Chamfering the acute angle side of the sipe 11 in this manner enables the uneven wear resistance performance to be further improved. Alternatively, the chamfered portions 12A and 12B may be formed on the obtuse angle side of the sipe 11. Forming the chamfered portion 12 on the obtuse angle side of the sipe 11 in this manner enables the edge effect to be increased and the steering stability performance on wet road surfaces to be further improved.

In the present technology, having the entire shape of the sipe 11 curved as described above enables the steering stability performance to be improved on wet road surfaces. Further, a part of the sipe 11 may be curved or bent in a plan view. Forming the sipe 11 in this manner increases the total amount of the edges 11A, 11B in each sipe 11, enabling the steering stability performance on wet road surfaces to be improved.

As illustrated in FIG. 7, one chamfered portion 12 is disposed on each of the edge 11A on the leading side and the edge 11B on the trailing side of the sipe 11. Having the chamfered portion 12 disposed in this manner enables the uneven wear resistance performance to be improved. Here, forming the chamfered portion 12 in two or more places on the edge 11A on the leading side and the edge 11B on the trailing side of the sipe 11 increases the number of nodes and tends to deteriorate the uneven wear resistance performance.

Here, the maximum value of the width of the chamfered portion 12 measured along the direction orthogonal to the sipe 11 is defined as a width W1. In this case, the maximum width W1 of the chamfered portion 12 is preferably from 0.8 to 5.0 times, and more preferably from 1.2 to 3.0 times, the sipe width W of the sipe 11. Setting the maximum width W1 of the chamfered portion 12 with respect to the sipe width W at an appropriate value in this manner enables the steering stability performance on dry road surfaces and the steering stability performance on wet road surfaces to be improved in a compatible manner. Here, when the maximum width W1 of the chamfered portion 12 is smaller than 0.8 times the sipe width W of the sipe 11, improvement in the steering stability performance on wet road surfaces is made insufficient, and if it is larger than 5.0 times, improvement in the steering stability performance on dry road surfaces is made insufficient.

As illustrated in FIGS. 2 and 3, the ends of the chamfered portions 12A and 12B positioned closer to the main groove 9 are respectively in communication with the main grooves 9 located on both sides of the rib 10. Forming the chamfered portions 12A and 12B in this manner enables the steering stability performance on wet road surfaces to be further improved. Alternatively, the ends of the chamfered portions 12A and 12B positioned closer to the main groove 9 may terminate in the rib 10 without communicating with the main groove 9. Forming the chamfered portions 12A and 12B in this way enables the steering stability performance on dry road surfaces to be further improved.

Figure 8A:
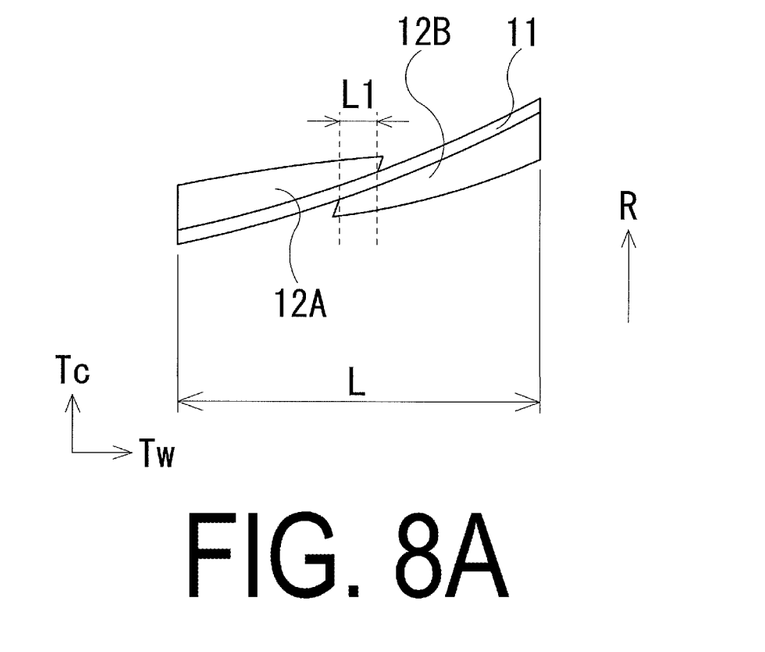
Figure 8B:
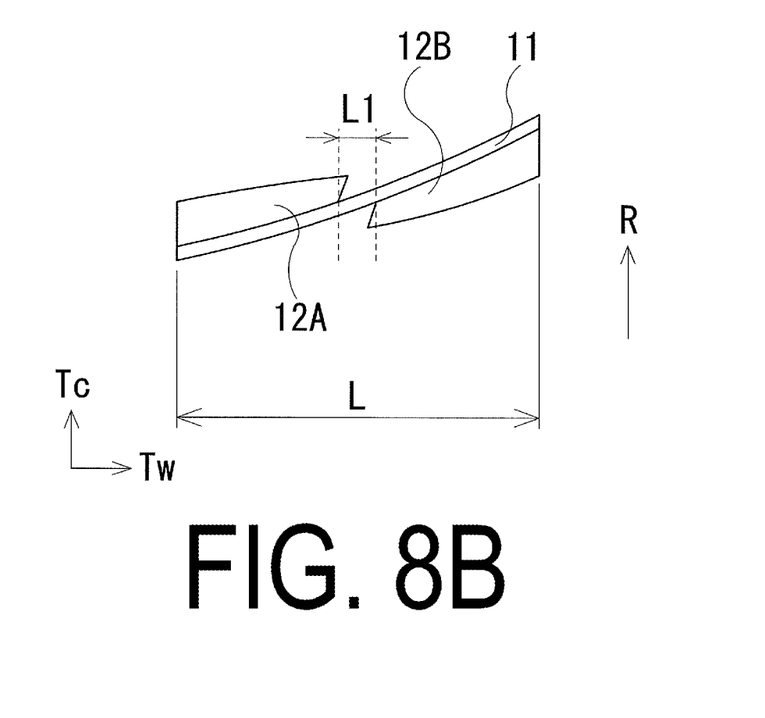

As illustrated in FIG. 8A, the chamfered portion 12A and the chamfered portion 12B are formed so that parts of both chamfered portions 12A, 12B overlap each other at the central portion of the sipe 11. Here, the length in the tire width direction of the overlap portion, which is a portion where the chamfered portion 12A and the chamfered portion 12B overlap, is set as an overlap length L1. At the same time, as illustrated in FIG. 8B, in a case that parts of both chamfered portion 12A and chamfered portion 12B do not overlap and are spaced apart from each other at a certain distance, the ratio of the sipe overlap length L1 to the sipe length L is expressed as a negative value. The overlap length L1 of the overlap portion is preferably from −30% to 30%, and more preferably from −15% to 15%, of the sipe length L. Appropriately configuring the overlap length L1 in the chamfered portion 12 with respect to the sipe length L in this manner enables improvement in the steering stability performance on dry road surfaces and improvement in the steering stability performance on wet road surfaces to be achieved in a compatible manner. Here, if the overlap length L1 is larger than 30%, improvement in the steering stability performance on dry road surfaces becomes insufficient, and if it is smaller than −30%, improvement in the steering stability performance on wet road surfaces becomes insufficient.

Figure 9:
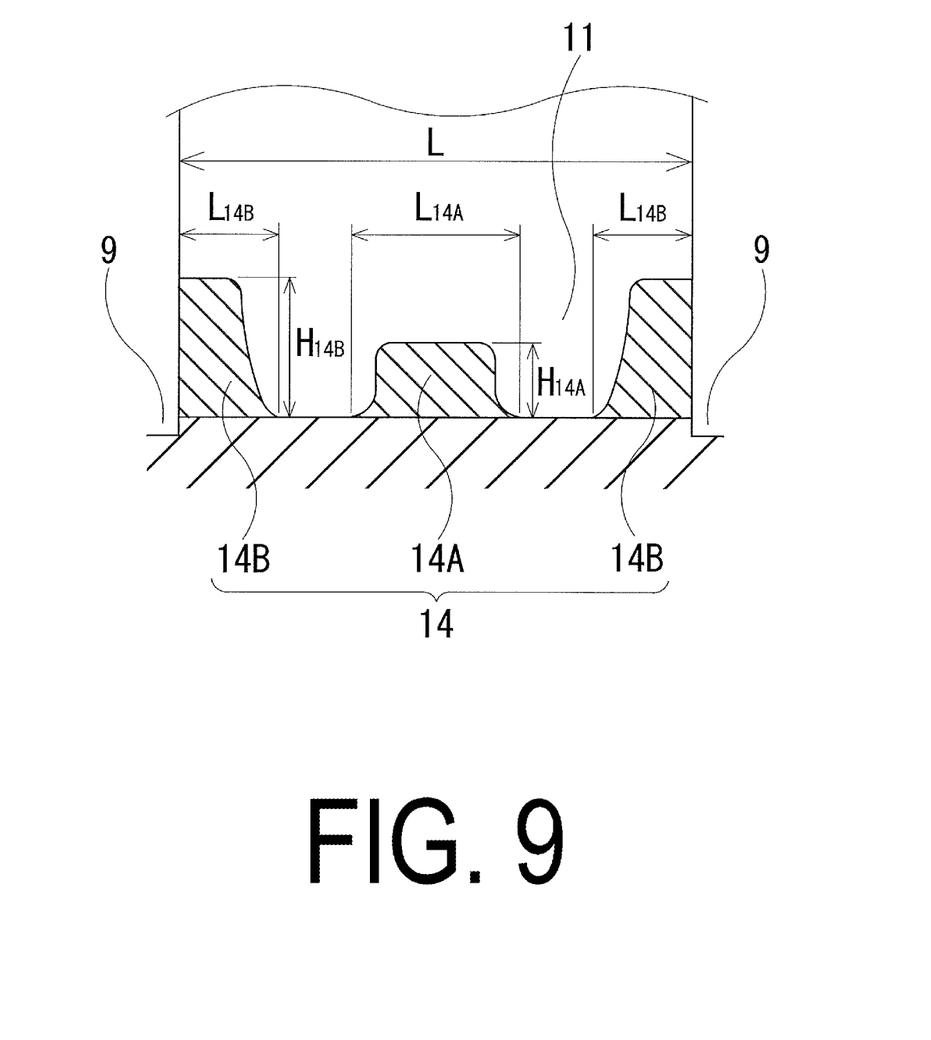
FIG. 9 is a cross-sectional view taken along the line Y-Y of FIG. 3.

As illustrated in FIG. 9, the sipe 11 has a raised bottom portion 14 in part of the longitudinal direction thereof. The raised bottom portion 14 includes a raised bottom portion 14A positioned at the central portion of the sipe 11, and a raised bottom portion 14B positioned at both ends of the sipe 11. Providing the raised bottom portion 14 in the sipe 11 in this manner enables improvement in the steering stability performance on dry road surfaces and improvement in the steering stability performance on wet road surfaces to be achieved in a compatible manner. The raised bottom portion 14 of the sipe 11 may be formed at an end portion and/or a non-end portion of the sipe 11.

The height of the raised bottom portion 14 in the tire radial direction formed in the sipe 11 is defined as a height $H_{14}$. In the raised bottom portion 14A formed at a position other than the end of the sipe 11, the maximum value of the height from the groove bottom of the sipe 11 to the upper surface of the raised bottom portion 14A is set as a height $H_{14A}$. This height $H_{14A}$ is preferably from 0.2 to 0.5 times, and more preferably from 0.3 to 0.4 times, the maximum depth x of the sipe 11. Setting the height $H_{14A}$ of the raised bottom portion 14A disposed at a position other than the end of the sipe 11 at an appropriate height in this manner enables the rigidity of the block 101 to be improved, and at the same time the drainage effect to be maintained, thereby improving the steering stability performance on wet road surfaces. Here, if the height $H_{14A}$ is smaller than 0.2 times the maximum depth x of the sipe 11, the rigidity of the block 101 cannot be sufficiently improved, and if it is larger than 0.5 times, the steering stability performance on wet road surfaces cannot be sufficiently improved.

In the raised bottom portion 14B formed at both ends of the sipe 11, the maximum value of the height from the groove bottom of the sipe 11 to the upper surface of the raised bottom portion 14B is set as a height $H_{14B}$. This height $H_{14B}$ is preferably 0.6 to 0.9 times, and more preferably 0.7 to 0.8 times, the maximum depth x of the sipe 11. Setting the height $H_{14B}$ of the raised bottom portion 14B formed at the end of the sipe 11 at an appropriate height in this manner enables the rigidity of the block 101 to be improved, enabling the steering stability performance on dry road surfaces to be improved. Here, if the height $H_{14B}$ is smaller than 0.6 times the maximum depth x of the sipe 11, the rigidity of the block 101 cannot be sufficiently improved, and if it is larger than 0.9 times, the steering stability performance on wet road surfaces cannot be sufficiently improved.

Further, the length in the tire width direction at the raised bottom portion 14 of the sipe 11 is set as a bottom raised length $L_{14}$. The raised lengths $L_{14A}$ and $L_{14B}$ of the raised bottom portions 14A and 14B are preferably 0.3 to 0.7 times, and more preferably 0.4 to 0.6 times, the sipe length L. Appropriately setting the raised lengths $L_{14A}$ and $L_{14B}$ of the raised bottom portions 14A and 14B in this manner enables improvement in the steering stability performance on dry road surfaces and improvement in the steering stability performance on wet road surfaces to be achieved in a compatible manner.

EXAMPLES

Pneumatic tires, including a plurality of main grooves extending in the tire circumferential direction in a tread portion, and sipes, extending in the tire width direction on a rib defined by the main grooves and having a tire size of 245/40 R19, were manufactured according to the following settings as shown in Tables 1 and 2 for the Conventional Examples 1, 2 and Examples 1 to 15: chamfer arrangement (both sides or one side); relationship between sipe length L and chamfer lengths $L_A$, $L_B$; whether the part facing the chamfered portion is chamfered; whether there is an outer edge profile line not parallel to the ridge line of the sipe at the chamfered portion; relationship between projected area Ia of the inner region and projected area Oa of the outer region at the chamfered portion; sipe maximum depth x (mm); chamfered portion maximum depth y (mm); ratio of projected area Oa of the outer region to projected area Ia of the inner region (Oa/Ia); position of the chamfered portion (vehicle inner side or vehicle outer side); sipe inclination angle with respect to the tire circumferential direction; the entire shape of the sipe (straight or curved); whether the chamfered portion is opened to the main groove; ratio of the chamfered portion overlap length L1 to the sipe length L; chamfered portion maximum width W1 to the sipe width W (W1/W); whether the sipe raised bottom portion is provided (at the center only or at the end only); sipe raised bottom portion height with respect to the sipe maximum depth x ($H_{14}$/x); and sipe bottom raised length with respect to the sipe length L ($L_{14}$/L).

In all of these test tires, the sipes formed in the ribs are open sipes whose both ends communicate with the main groove.

These test tires were tested by a test driver for a sensory evaluation of steering stability performance on dry road surfaces, steering stability performance on wet road surfaces, and snow performance, with the result indicated in Tables 1 and 2.

Sensory evaluations on the stability performance on dry road surfaces, the steering stability performance on wet road surfaces, and the snow performance was conducted by assembling each test tire to a rim size 19×8.5 J wheel and mounting it on a vehicle with air pressure of 260 kPa. Evaluation results are expressed as index values, with the results of Conventional Example 1 being assigned an index value of 100. Larger index values indicate superior steering stability performance on dry road surfaces, superior steering stability performance on wet road surfaces, and snow performance.

TABLE 1

|  | Conventional Example 1 | Conventional Example 2 | Example 1 |
|---|---|---|---|
| Chamfer arrangement (both sides or one side) | Both sides | One side | Both sides |
| Relationship between sipe length L and chamfer lengths $L_A$, $L_B$ | L > $L_A$, $L_B$ | L = $L_A$ | L > $L_A$, $L_B$ |
| Whether part facing chamfered portion is chamfered | Yes | No | No |
| Whether there is outer edge profile line not parallel to sipe ridge line at chamfered portion | No | No | Yes |
| Relationship between projected area Ia of inner region and projected area Oa of outer region at chamfered portion | Ia = Oa | Ia = Oa | Ia < Oa |
| Sipe maximum depth x (mm) | 6 mm | 6 mm | 6 mm |
| Chamfered portion maximum depth y (mm) | 3 mm | 3 mm | 3 mm |
| Ratio of outer region projected area Oa to inner region projected area Ia (Oa/Ia) | 1.0 | 1.0 | 5.0 |
| Position of chamfered portion (vehicle inner side or vehicle outer side) | — | — | Vehicle outer side |
| Sipe inclination angle with respect to tire circumferential direction | 90° | 90° | 90° |
| Entire shape of sipe (straight or curved) | Straight line | Straight line | Straight line |
| Whether chamfered portion is opened to main groove | Yes | Yes | Yes |
| Ratio of chamfered portion overlap length L1 to sipe length L | — | — | 0% |
| Chamfered portion maximum width W1 to sipe width W (W1/W) | 0.5 times | 0.5 times | 0.5 times |
| Whether sipe raised bottom portion is provided (only at center or only at end) | No | No | No |

TABLE 1-continued

|  |  |  |  |
|---|---|---|---|
| Sipe raised bottom portion height with respect to sipe maximum depth x ($H_{14}/x$) | — | — | — |
| Sipe bottom raised length with respect to sipe length L ($L_{14}/L$) | — | — | — |
| Dry road surface steering stability performance | 100 | 90 | 101 |
| Wet road surface steering stability performance | 100 | 105 | 105 |
| Snow performance | 100 | 100 | 105 |

|  | Example 2 | Example 3 | Example 4 | Example 5 | Example 6 |
|---|---|---|---|---|---|
| Chamfer arrangement (both sides or one side) | Both sides | Both sides | Both sides | Both sides | Both sides |
| Relationship between sipe length L and chamfer lengths $L_A$, $L_B$ | $L > L_A, L_B$ | $L > L_A, L_B$ | $L > L_A, L_B$ | $L > L_A, L_B$ | $L > L_A, L_B$ |
| Whether part facing chamfered portion is chamfered | No | No | No | No | No |
| Whether there is outer edge profile line not parallel to sipe ridge line at chamfered portion | Yes | Yes | Yes | Yes | Yes |
| Relationship between projected area Ia of inner region and projected area Oa of outer region at chamfered portion | Ia < Oa | Ia < Oa | Ia < Oa | Ia < Oa | Ia < Oa |
| Sipe maximum depth x (mm) | 6 mm | 6 mm | 6 mm | 6 mm | 6 mm |
| Chamfered portion maximum depth y (mm) | 2 mm | 2 mm | 2 mm | 2 mm | 2 mm |
| Ratio of outer region projected area Oa to inner region projected area Ia (Oa/Ia) | 5.0 | 2.0 | 2.0 | 2.0 | 2.0 |
| Position of chamfered portion (vehicle inner side or vehicle outer side) | Vehicle outer side | Vehicle outer side | Vehicle inner side | Vehicle inner side | Vehicle inner side |
| Sipe inclination angle with respect to tire circumferential direction | 90° | 90° | 90° | 60° | 60° |
| Entire shape of sipe (straight or curved) | Straight line | Straight line | Straight line | Straight line | Curved |
| Whether chamfered portion is opened to main groove | Yes | Yes | Yes | Yes | Yes |
| Ratio of chamfered portion overlap length L1 to sipe length L | 0% | 0% | 0% | 0% | 0% |
| Chamfered portion maximum width W1 to sipe width W (W1/W) | 0.5 times | 0.5 times | 0.5 times | 0.5 times | 0.5 times |
| Whether sipe raised bottom portion is provided (only at center or only at end) | No | No | No | No | No |
| Sipe raised bottom portion height with respect to sipe maximum depth x ($H_{14}/x$) | — | — | — | — | — |
| Sipe bottom raised length with respect to sipe length L ($L_{14}/L$) | — | — | — | — | — |
| Dry road surface steering stability performance | 102 | 103 | 104 | 105 | 105 |
| Wet road surface steering stability performance | 105 | 105 | 106 | 106 | 107 |
| Snow performance | 105 | 105 | 106 | 106 | 107 |

TABLE 2

|  | Example 7 | Example 8 | Example 9 | Example 10 |
|---|---|---|---|---|
| Chamfer arrangement (both sides or one side) | Both sides | Both sides | Both sides | Both sides |
| Relationship between sipe length L and chamfer lengths $L_A$, $L_B$ | $L > L_A, L_B$ | $L > L_A, L_B$ | $L > L_A, L_B$ | $L > L_A, L_B$ |
| Whether part facing chamfered portion is chamfered | No | No | No | No |
| Whether there is outer edge profile line not parallel to sipe ridge line at chamfered portion | Yes | Yes | Yes | Yes |
| Relationship between projected area Ia of inner region and projected area Oa of outer region at chamfered portion | Ia < Oa | Ia < Oa | Ia < Oa | Ia < Oa |

TABLE 2-continued

| | | | | |
|---|---|---|---|---|
| Sipe maximum depth x (mm) | 6 mm | 6 mm | 6 mm | 6 mm |
| Chamfered portion maximum depth y (mm) | 2 mm | 2 mm | 2 mm | 2 mm |
| Ratio of outer region projected area Oa to inner region projected area Ia (Oa/Ia) | 2.0 | 2.0 | 2.0 | 2.0 |
| Position of chamfered portion (vehicle inner side or vehicle outer side) | Vehicle inner side | Vehicle inner side | Vehicle inner side | Vehicle inner side |
| Sipe inclination angle with respect to tire circumferential direction; | 60° | 60° | 60° | 60° |
| Entire shape of sipe (straight or curved) | Curved | Curved | Curved | Curved |
| Whether chamfered portion is opened to main groove | No | Yes | Yes | Yes |
| Ratio of chamfered portion overlap length L1 to sipe length L | 0% | 10% | −10% | 10% |
| Chamfered portion maximum width W1 with respect to sipe width W (W1/W) | 0.5 times | 0.5 times | 0.5 times | 2.0 times |
| Whether sipe raised bottom portion is provided (at center only or at end only); | No | No | No | No |
| Sipe raised bottom portion height with respect to sipe maximum depth x ($H_{14}/x$) | — | — | — | — |
| Sipe bottom raised length with respect to sipe length L ($L_{14}/L$) | — | — | — | — |
| Dry road surface steering stability performance | 106 | 104 | 108 | 104 |
| Wet road surface steering stability performance | 107 | 108 | 105 | 109 |
| Snow performance | 107 | 108 | 105 | 108 |

| | Example 11 | Example 12 | Example 13 | Example 14 |
|---|---|---|---|---|
| Chamfer arrangement (both sides or one side) | Both sides | Both sides | Both sides | Both sides |
| Relationship between sipe length L and chamfer lengths $L_A$, $L_B$ | $L > L_A, L_B$ | $L > L_A, L_B$ | $L > L_A, L_B$ | $L > L_A, L_B$ |
| Whether part facing chamfered portion is chamfered | No | No | No | No |
| Whether there is outer edge profile line not parallel to sipe ridge line at chamfered portion | Yes | Yes | Yes | Yes |
| Relationship between projected area Ia of inner region and projected area Oa of outer region at chamfered portion | Ia < Oa | Ia < Oa | Ia < Oa | Ia < Oa |
| Sipe maximum depth x (mm) | 6 mm | 6 mm | 6 mm | 6 mm |
| Chamfered portion maximum depth y (mm) | 2 mm | 2 mm | 2 mm | 2 mm |
| Ratio of outer region projected area Oa to inner region projected area Ia (Oa/Ia) | 2.0 | 2.0 | 2.0 | 2.0 |
| Position of chamfered portion (vehicle inner side or vehicle outer side) | Vehicle inner side | Vehicle inner side | Vehicle inner side | Vehicle inner side |
| Sipe inclination angle with respect to tire circumferential direction; | 60° | 60° | 60° | 60° |
| Entire shape of sipe (straight or curved) | Curved | Curved | Curved | Curved |
| Whether chamfered portion is opened to main groove | Yes | Yes | Yes | Yes |
| Ratio of chamfered portion overlap length L1 to sipe length L | 10% | 10% | 10% | 10% |
| Chamfered portion maximum width W1 with respect to sipe width W (W1/W) | 2.0 times | 2.0 times | 2.0 times | 2.0 times |
| Whether sipe raised bottom portion is provided (at center only or at end only); | Yes (at center only) | Yes (at center only) | Yes (at end only) | Yes (at end only) |
| Sipe raised bottom portion height with respect to sipe maximum depth x ($H_{14}/x$) | 0.6 times | 0.3 times | 0.8 times | 0.8 times |
| Sipe bottom raised length with respect to sipe length L ($L_{14}/L$) | 0.2 times | 0.2 times | 0.2 times | 0.5 times |
| Dry road surface steering stability performance | 106 | 105 | 107 | 108 |

TABLE 2-continued

| | | | | |
|---|---|---|---|---|
| Wet road surface steering stability performance | 109 | 110 | 109 | 109 |
| Snow performance | 108 | 109 | 109 | 109 |

As can be seen from Tables 1 and 2, by devising the shape of the chamfered portion formed in the sipe, at the same time the snow performance is improved, the steering stability performance on dry road surfaces and the steering stability performance on wet road surfaces were both improved in the tires of Examples 1 to 14.

The invention claimed is:

1. A pneumatic tire comprising: a plurality of main grooves extending in a tire circumferential direction in a tread portion; and a sipe extending in a tire width direction in a rib defined by the plurality of main grooves, the sipe comprising a leading side edge and a trailing side edge, a chamfered portion shorter than a sipe length of the sipe being formed in each of the leading side edge and the trailing side edge, a non-chamfered region without other chamfered portions being present in a part facing each chamfered portion of the sipe, in a plan view of the tread portion, at least one of the chamfered portions including an outer edge profile line not parallel to a ridge line of the sipe, and when a chamfered portion having the outer edge profile line not parallel to the ridge line of the sipe is divided into an inner region and an outer region corresponding to half a chamfer length of the chamfered portion in the tire width direction, a projected area Oa of the outer region positioned on a rib outer side being larger than a projected area Ia of the inner region positioned on a rib inner side;

wherein each of the chamfered portions have a sipe edge extending along a length direction of the sipe where the chamfered portion intersects the sipe and an opposite edge opposite the sipe edge, where a tire width direction component of a length of the sipe edge in the tire width direction is shorter than a tire width direction component of a length of the opposite edge in the tire width direction.

2. The pneumatic tire according to claim 1, wherein, a ratio Oa/Ia of the projected area Oa of the outer region to the projected area Ia of the inner region is from 1.2 to 2.0.

3. The pneumatic tire according to claim 1, wherein, the pneumatic tire has a designated mounting direction with respect to a vehicle, and the chamfered portion comprising the outer edge profile line not parallel to the ridge line of the sipe is positioned on a vehicle inner side.

4. The pneumatic tire according to claim 1, wherein, a maximum depth x (mm) of the sipe and a maximum depth y (mm) of the chamfered portion satisfy a relationship of a following formula (1), and a sipe width of the sipe is constant in a range from an end positioned inward of the chamfered portion in a tire radial direction to a groove bottom of the sipe:

$$x \times 0.1 \leq y \leq x \times 0.3 + 1.0 \tag{1}.$$

5. The pneumatic tire according to claim 4, wherein, a ratio Oa/Ia of the projected area Oa of the outer region to the projected area Ia of the inner region is from 1.2 to 2.0.

6. The pneumatic tire according to claim 5, wherein, the pneumatic tire has a designated mounting direction with respect to a vehicle, and the chamfered portion comprising the outer edge profile line not parallel to the ridge line of the sipe is positioned on a vehicle inner side.

* * * * *